United States Patent [19]
Zeuner

[11] 3,737,141
[45] June 5, 1973

[54] NORMALLY CLOSED SOLENOID OPERATED VALVE

[75] Inventor: Kenneth W. Zeuner, Newtown, Pa.

[73] Assignee: Control Concepts Inc., Richboro, Pa.

[22] Filed: Apr. 13, 1972

[21] Appl. No.: 243,633

[52] U.S. Cl. ................................. 251/129, 251/141
[51] Int. Cl. ................................. F16k 31/06
[58] Field of Search ................. 251/141, 129, 76, 251/139, 30

[56] References Cited
UNITED STATES PATENTS

| 3,381,932 | 5/1968 | O'Kane | 251/30 |
| 2,405,906 | 10/1968 | Keller | 251/30 |

*Primary Examiner*—Arnold Rosenthal
*Attorney*—Allan Ratner

[57] ABSTRACT

A normally closed solenoid operated poppet valve having an armature with a section which engages and pulls the poppet out of an orifice to control fluid flow. A pole piece surface forms a first air gap with the armature and a second air gap with the poppet when the valve is in its normally closed state. The second air gap is substantially greater in magnitude than the first air gap. Upon application of electromagnetic flux lines there is an attractive force between the armature and the pole piece attracting the armature and pulling the poppet to a partially open position. Thereafter, the attractive force between the poppet and pole piece attracts the poppet away from the orifice to the valve open state.

9 Claims, 7 Drawing Figures

3,737,141

NORMALLY CLOSED SOLENOID OPERATED VALVE

BACKGROUND OF THE INVENTION

1. Field of the Invention

This invention relates to the field of normally closed solenoid operated valve assemblies.

2. Prior Art

Normally closed solenoid operated poppet valves have been known in which the poppet is pulled out of the orifice when the valve is actuated to the open state. These prior valves have left much to be desired since the amount of force produced by the electromagnetic coil has been directly related to and thereby served to limit the work the valve could perform. In an attempt to increase the efficiency of these normally closed valves, a mass armature has been used in which the armature has been accelerated and by impact pulls open a poppet against a very high valued fluid pressure. However, such valves still have not produced the high magnitude pull required in many practical applications. A further difficulty has been that the armature or "hammer" must be returned to its initial position by gravity. Thus, the valve is limited in the manner in which it may be oriented.

SUMMARY OF THE INVENTION

A normally closed solenoid operated valve assembly having a poppet which is movable between the valve closed state in which the poppet is seated in and closes an orifice and a valve open state. An armature is provided having a section which is moved to engage and pull the poppet. A pole piece surface is spaced from and forms a first air gap with the armature and a second air gap with the poppet when the valve is in a normally closed state. The second air gap is substantially greater in magnitude than the first air gap. In order to actuate the valve assembly, a circuit of electromagnetic flux lines provides (1) an attractive force between the armature and the pole piece of magnitude to attract the armature thereby pulling the poppet away from the orifice against the closing force thereby to partially open the poppet and (2) an attractive force between the poppet and the pole piece of sufficient magnitude to attract the poppet away from the orifice to the valve open state.

BRIEF DESCRIPTION OF THE DRAWINGS

FIG. 5 is a diagram showing a force-distance relationship across air gap 45 and air gap 46a shown in FIGS. 2 and 4–6.

Referring now to FIGS. 1–3, there is shown a single stage normally closed solenoid operated poppet valve assembly 10. Valve assembly 10 comprises a tubular sleeve assembly or housing 12 having threads 12a formed on the outer surface of a lower sleeve section 12d. Threads 12a engage upper internal threads 14a of a valve body 14. Sleeve assembly 12 comprises the lower sleeve section 12d, a middle sleeve section 12c and an upper sleeve section 12b. Sections 12b and 12d are made of very high magnetically permeable material which is defined as ferromagnetic. On the other hand, section 12c is made of very low magnetically permeable material, such as for example, stainless steel. As shown, sections 12b–d are rigidly secured together as for example, by welding.

Figure 1:
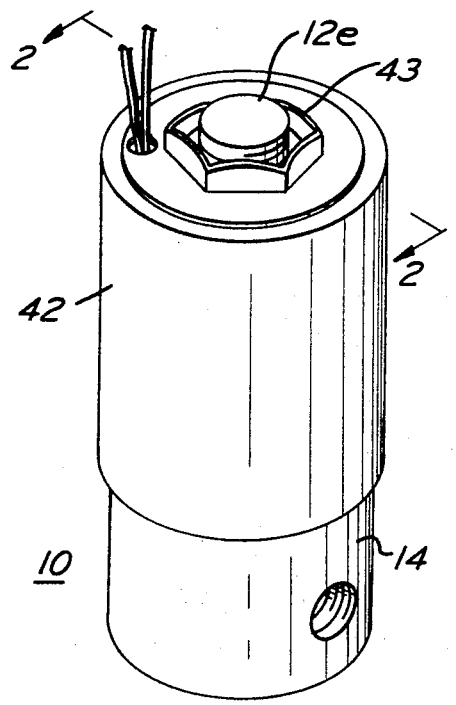
FIG. 1 is a perspective view of a normally open solenoid operated valve assembly of the present invention.

Sections 12b–d together provide an internal cylindrical chamber 16 for housing a tubular armature 20 and a tubular stop 22. Armature 20 has cylindrical central chamber 20a and a reduced inner diameter section 20b. Stop 22 has a cylindrical central chamber 22a coaxial with chamber 20a. Armature 20 is slideably received within chamber 16 with the upper portion thereof being within section 12c and the lower portion thereof being within section 12d. Stop 22 nests in sealed relation within chamber 16 with a lower flange 22b of stop 22 engaging a lip formed in chamber 16. All of stop 22 is disposed within section 12d.

Secured between the bottom surface of stop 22 and valve body 14, is a control orifice assembly 25 having a central chamber 25a which is in fluid communication with an outlet 14c of valve body 14 as shown. Chamber 25a tapers upwardly to form at its upper end, an orifice 25b which provides a seat for a poppet or pilot 23. In order to provide proper alignment, orifice assembly 25 has a shoulder 25c which is received within chamber 25a and is coaxial therewith.

Poppet 23 moves acially within chambers 20a and 22a. Poppet 23 may be formed in one piece having a lower portion 23a and intermediate or guide portion 23b and an upper portion 23c. Lower portion 23a terminates in a valve plug 23d. Guide 23b has side walls 23e which contact and slide within chamber 20a and are dimensioned to assure proper alignment of plug 23d into and out of orifice 25b. In addition, flat walls 23f are formed between side walls 23e to provide flow passages for the fluid. A lower shoulder 23g of guide 23 is engaged by reduced section 20b when armature 20 moves upwardly. Section 20b has a larger inner diameter than the outer diameter of poppet portion 23a to avoid contact therebetween.

A spring 30 is disposed between and engages the upper wall 17 of chamber 16 and the upper shoulder of guide 23b. The compressive effect or bias of spring 30 on poppet 23 will later be described. It will be understood that in the normally closed position shown in FIGS. 2 and 4, armature 20 is free to move between shoulder 23g and stop 22.

A pair of aligned channels or slots 22c are formed through a flange 22b of stop 22 to permit fluid flow from inlet 14b to chamber 22a. A longitudinal channel 20b is formed in the outer wall of armature 20 to allow fluid flow around the armature. A thin washer 18 adheres to wall 17 which wall defines a surface of a pole piece.

For a source of magnetic flux, there is provided a hollow elongated cylindrically shaped electromagnet 40 which receives in a central opening sleeve assembly 12. A cup-shaped cover 42 encloses and protects electromagnet 40 and extends down to valve body 14 and encloses an upper portion thereof. Cover 42 has a central opening for receiving therein an upper threaded portion 12e of sleeve section 12b. Cover 42 is secured in place by a nut 43 which threadedly engages the threads of portion 12e. Cover 42 as well as armature 20, stop 22, poppet 23 and body 14 are formed of high magnetically permeable material (ferromagnetic). Washer 18 is formed of very low magnetically permeable material.

The circuit of magnetic flux lines produced by electromagnet 40 when energized may be traced as follows. The flux lines flow down through sleeve section 12b and then from pole piece surface 17 through washer 18 and air gap 45 to armature 20 and poppet 23. The flow continues from armature 20 and poppet 23, to sleeve section 12d, body 14 and cover 42 with the circuit being completed to section 12b. Sleeve section 12c, made of very low magnetically permeable material, extends from pole piece 17 substantially below (and the area generally adjacent) air gaps 45 and 46 so that section 12c provides a gap to the circuit greater than that of gap 45. Accordingly, the circuit of flux lines is directed and concentrated through washer 18 and air gap 45. In the illustrated normally closed state of FIGS. 2 and 4, the air gap 45 distance may be, for example, from 0.010 to 0.020 inches. In the same state, air gap 46 is of substantially greater magnitude, as for example, 0.040 inches.

Figure 2:
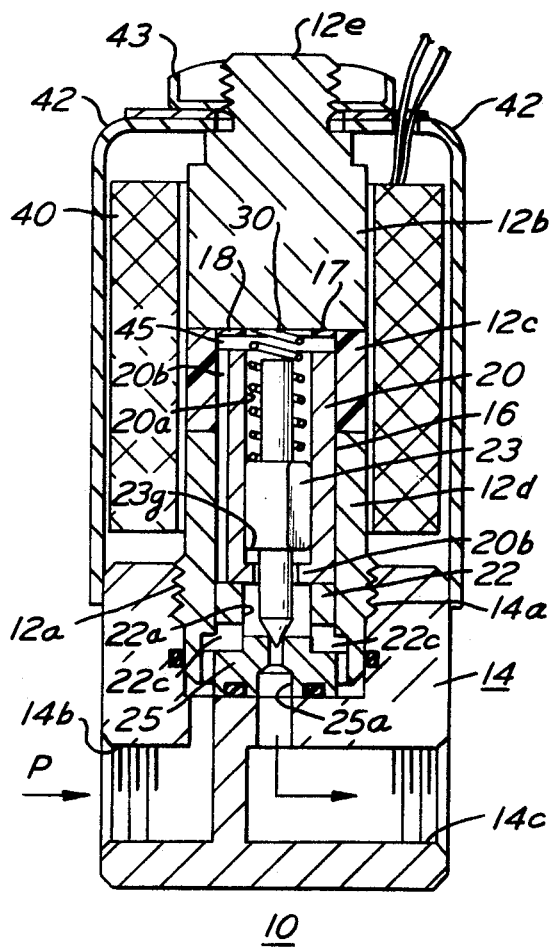
FIG. 2 is an elevational sectional view of the valve of FIG. 1 taken along lines 2—2 in the valve normally closed state.
Figure 3:
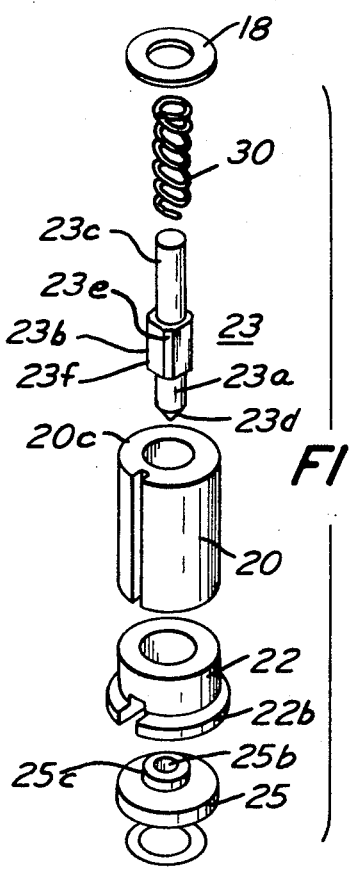
FIG. 3 is an exploded view of many of the valve elements of FIG. 2.
Figure 4:
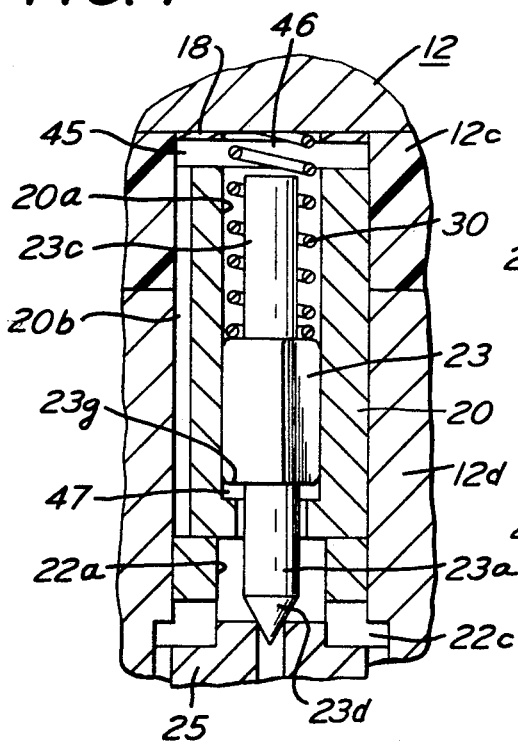
FIGS. 4–6 show a sectional view of a portion of FIG. 2 with the valve in a normally closed position, a valve partially open position and a valve fully open position, respectively.

As illustrated in FIGS. 2 and 4, valve 10 is in a normally closed state and the fluid pressure P applied to inlet 14a is effective to seal orifice 25b with poppet plug 23b. The inlet pressure flows above poppet 23 through channel 20d and also by way of the fluid passage provided by flat walls 23f. In this manner, there is a pressure balance within chamber 16. Spring 30 is provided only to overcome the frictional forces and the mass effect of poppet 23 in the event valve 10 is used in position other than that illustrated. The closing or force sealing the orifice is equal to the differential between inlet and outlet pressure times the area of orifice 25b plus the force provided by spring 30.

Figure 5:
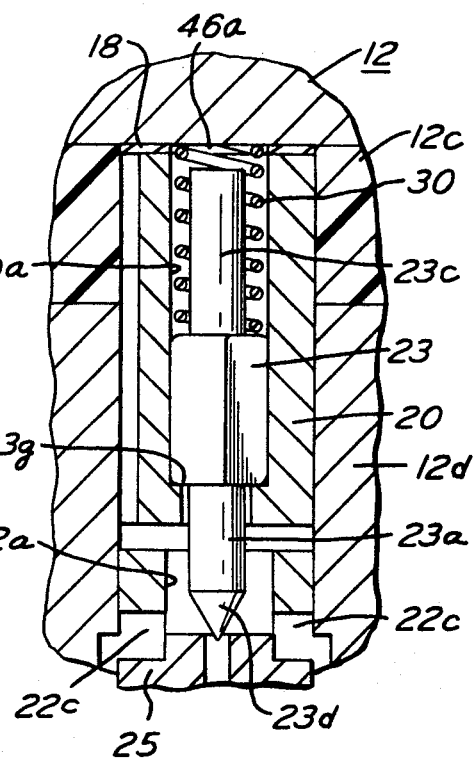

Upon initial energization of electromagnet 40, the magnetic flux lines are effective to produce an attractive force between pole piece 17 and the upper annular surface 20c of armature 20. The attractive force is of sufficient value to attract armature 20 to pole piece 17 until the armature contacts and is seated against washer 18 as illustrated in FIG. 5. With the upward movement of armature 20, section 20b engages shoulder 23g of poppet 23 thereby pulling or forcing plug 23d upward from orifice 25b against the previously described closing force. Thus, in the first position or step illustrated in FIG. 5, the orifice has become partially open.

Figure 7:
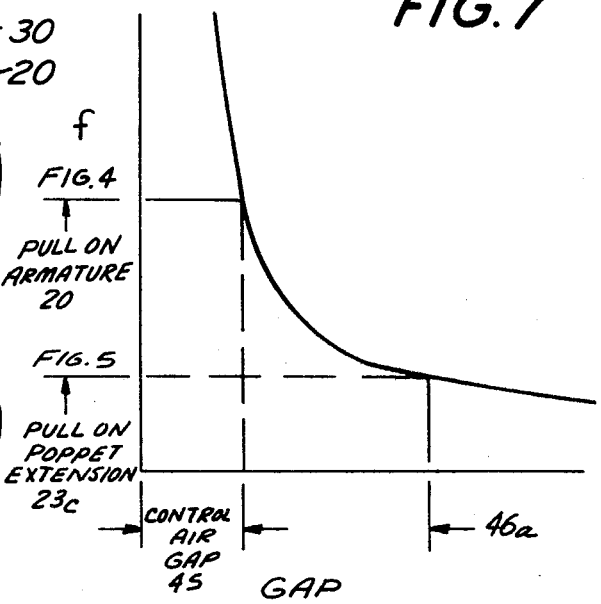

It will be understood that this work performed by the armature in pulling plug 23d is of substantially high value since the differential pressure is at a maximum with plug 23d within seat 25b, and thus, the closing force is at a maximum. Such a high value of work is achieved only because the air gap 45 distance is of substantially small value so that the upper portion of the force-distance curve is used as illustrated in FIG. 7. In this portion of the curve, with the air gap 45 distance of small value, a pulling force of substantially high value is achieved which is required to overcome the high magnitude closing force on poppet 23.

It will be understood that pole piece 17, in the initial position illustrated in FIG. 4, was unable to attract extension 23c since the closing force was substantially greater at that time than the attractive force across air gap 46 between poppet extension 23c and piece 17. However, the differential pressure, at a maximum with plug 23d totally within seat 25b, begins to decrease as plug 23d is pulled from the orifice. Accordingly, when poppet extension 23c reaches the first position shown in FIG. 5, the differential pressure has been reduced to a value so that the attractive force then provided across decreased air gap 46a between extension 23c and piece 17 is sufficient to overcome the remaining closing force. In this manner, poppet 23 is moved away from orifice 25b to the valve substantially fully open state shown in FIG. 6. In this state, a full or sufficient stroke has been taken in which the area immediately surrounding orifice 25b equals to or exceeds the area of the orifice itself. It will be understood that the distance value of air gap 46a to provide the desired attractive force shown in FIG. 7 is a function of air gap 45 and of spacing 47 between guide shoulder 23g and section 20b with valve 10 in a normally closed state shown in FIG. 4. More particularly, the change in distance value from air gap 46 to 46a is equal to the value of air gap 45 minus the value of spacing 47.

Figure 6:
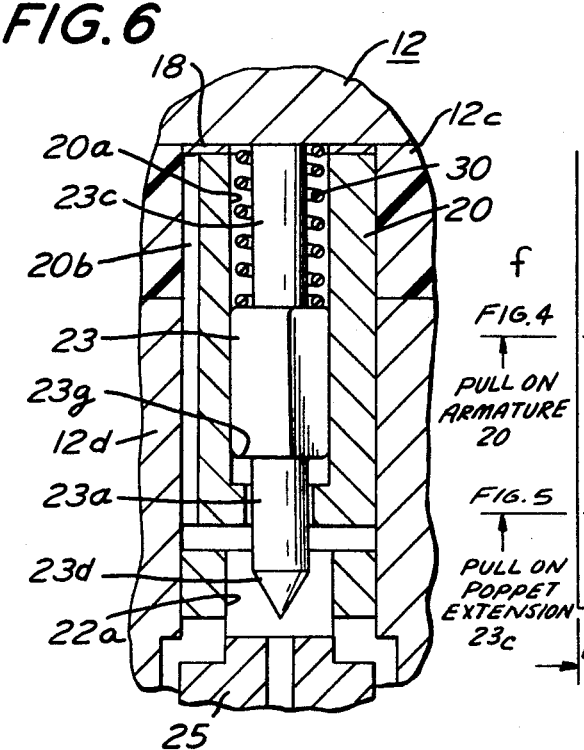

In returning from the valve open state shown in FIG. 6 to the normally closed state shown in FIG. 4, electromagnet 40 is deenergized and spring 30 is effective to overcome the residual magnetism in poppet 23. Accordingly, the spring pushes poppet 23 towards orifice 25b and the poppet then impacts on section 20b of armature 20 thereby aiding in the breaking of any residual attractive force between the armature and the piece 17. In this manner, there is achieved an improvement in reset response.

As previously described, a washer 18 may be provided as shown in FIGS. 2-6 between armature 20 and piece 17. While not essential, the purpose of the washer is to interrupt air gap 45 and thereby to reduce residual magnetism between the armature and the piece when electromagnet 40 is deenergized.

It will be understood that the operation to the first position illustrated in FIG. 5 and then the operation to the second position illustrated in FIG. 6 are not discrete steps since operation is actually continuous. These operations as described take place within milliseconds and the first position illustrated in FIG. 5 is not for practical purposes observable.

In an embodiment of the invention, a two step voltage may be applied to electromagnet 40. At a first lower valued voltage step, the magnetic flux lines are sufficient to move armature 20 from the FIG. 4 position to the first position shown in FIG. 5. However, such lower valued voltage step is not sufficient to produce an attractive force to pull poppet extension 23c to pole piece 17. As understood by those skilled in the art, such force levels may be calculated by use of the curve of FIG. 7 with respect to a predetermined differential pressure.

Upon application of a second higher valued voltage step, the attractive force produced by the flux lines is then sufficient to pull poppet extension 23c from the first position shown in FIG. 5 to that of FIG. 6. In this manner, there is achieved a first lower valued flow through orifice 25b which is then partially open upon application of the first voltage step. Upon application of the second voltage step, orifice 25b is substantially fully open for a second higher value flow through the orifice. Such two voltage step operation is to be compared with the previously described single voltage application which is of sufficient magnitude to achieve the dual pull as a continuous nonstop operation.

What is claimed is:

1. A normally closed solenoid operated valve assembly comprising
an orifice for controlling flow of fluid,
plug means movable between a valve normally closed state seating in and closing said orifice and a valve open state,
an armature having a section for engaging and pulling said plug means when said armature moves a predetermined distance,
pole piece means having a surface spaced from and forming a predetermined first air gap with said armature and a predetermined second air gap with said plug means when said valve is in said normally closed state, said second air gap being of magnitude substantially greater than that of said first air gap, and
means operable to produce a circuit of electromagnetic flux line flow for providing (1) an attractive force between said armature and said pole piece means of sufficient magnitude to attract said armature thereby pulling said plug means away from said orifice to a partially open position and (2) an attractive force between said plug means and said pole piece means of sufficient magnitude to attract said plug means away from said orifice to said valve open state.

2. The valve assembly of claim 1 in which said operable means produces said flux line flow of value, when said valve is in said closed state, for providing said attractive force of sufficient magnitude to attract said armature but of insufficient magnitude to attract said plug means away from said orifice to said valve open state.

3. The valve assembly of claim 1 in which said operable means includes an electromagnet for producing a circuit of electromagnetic flux line flow through said pole piece means, said first and second air gap, said armature and said plug means and means for energizing said electromagnet for operating said valve to said valve open state.

4. The valve assembly of claim 3 in which said energizing means comprises a circuit operable for providing a first lower valued voltage and a second higher valued voltage, said first voltage being of sufficient magnitude to produce said attractive force to attract said armature but insufficient to attract said plug means thereby to only actuate said valve to said partially open position, said second voltage being of sufficient magnitude to produce said attractive force of sufficient magnitude to attract said plug means thereby to actuate said valve to said valve open state.

5. The valve assembly of claim 1 in which there is provided a housing for said armature and said plug means, said housing being a very high magnetically permeable material except in the area generally adjacent said air gaps whereby said flux lines flow through said housing and provide a concentration of flux lines.

6. The valve assembly of claim 1 in which said armature includes a chamber for slideably receiving said plug means, said plug means includes a guide portion for slideable contact with said chamber and for engagement by said armature section, and said second air gap being disposed within said first air gap.

7. The valve assembly of claim 6 in which there is provided biasing means secured between said guide portion of said plug means and pole piece means to overcome the frictional force and the mass effect of said plug means.

8. The valve assembly of claim 7 in which said plug means comprises a poppet having said guide portion, a portion terminating in a valve plug and an extension, said guide portion having side walls which contact said chamber of said armature and are dimensioned to provide alignment of said valve plug into and out of said orifice, said extension extending from said guide portion and terminating in a surface forming said second air gap with said pole piece means.

9. The valve assembly of claim 1 in which there is provided a predetermined value space between said armature section and the portion of said plug means engaged by said armature section, said second air gap having a distance value at the time said orifice is partially open substantially equal to the value of said first air gap minus said space when said valve is in said normally closed state.

* * * * *